United States Patent
Floh et al.

(10) Patent No.: US 7,597,280 B2
(45) Date of Patent: Oct. 6, 2009

(54) APPARATUS FOR SEPARATING THE ORGANIC MEMBRANE PORTION AND THE MINERAL PORTION OF BROKEN EGG SHELLS

(75) Inventors: Roberto V. Floh, Thornhill (CA); Sergio Leonardo Jalfen, Richmond Hill (CA)

(73) Assignee: Eggshell Resources Inc., Thornhill, Ontario (CA)

( * ) Notice: Subject to any disclaimer, the term of this patent is extended or adjusted under 35 U.S.C. 154(b) by 45 days.

(21) Appl. No.: 12/033,526

(22) Filed: Feb. 19, 2008

(65) Prior Publication Data

US 2009/0206009 A1 Aug. 20, 2009

(51) Int. Cl.
*B02C 21/00* (2006.01)
*B02C 23/08* (2006.01)
*A01K 43/04* (2006.01)

(52) U.S. Cl. .................... 241/62; 241/79.1; 209/510

(58) Field of Classification Search .......... 241/2, 241/62, 79.1, 101.8; 209/510
See application file for complete search history.

(56) References Cited

U.S. PATENT DOCUMENTS

| 6,176,376 | B1 | 1/2001 | MacNeil | |
|---|---|---|---|---|
| 7,007,806 | B2 * | 3/2006 | MacNeil | 209/510 |
| 2003/0136711 | A1 * | 7/2003 | MacNeil | 209/510 |
| 2006/0159816 | A1 | 7/2006 | Vlad | |

* cited by examiner

*Primary Examiner*—Faye Francis
(74) *Attorney, Agent, or Firm*—Gerald A. Gowan; Gowan Intellectual Property

(57) ABSTRACT

Apparatus for separating the organic membrane portion and the non-organic mineral portion of broken egg shells includes at least one separating tank into which a slurry of water and finely ground egg shells is introduced. A plurality of overlapping vanes is in the interior of the tank. Separated low specific gravity membrane is withdrawn from near the top of the tank for dewatering and drying; the separated high specific gravity mineral portion is withdrawn from near the bottom of the tank for drying. Water from the dewatering means is returned to the bottom of the tank with sufficient force to cause an upward serpentine flow past the vanes, but not so as to preclude the settling of the mineral portion.

7 Claims, 2 Drawing Sheets

APPARATUS FOR SEPARATING THE ORGANIC MEMBRANE PORTION AND THE MINERAL PORTION OF BROKEN EGG SHELLS

FIELD OF THE INVENTION

This invention relates to an apparatus for separating the organic membrane portion from the non-organic mineral portion of broken egg shells. In particular, the present invention is directed to an egg shell separating apparatus which takes advantage of the differences between the low specific gravity of the organic membrane portion—less than 1.0—and the high specific gravity of the non-organic hard mineral portion—typically, between 2.7 and 3.0—without the necessity for turbulent flow or cavitation to cause the membrane portion and the hard mineral portion of the broken egg shells to separate one from the other.

BACKGROUND OF THE INVENTION

The food and pharmaceutical industries have recognized for some time the advantages of recovering the organic membrane portion, and in some cases the non-organic hard mineral portion of broken egg shells. The broken egg shells typically are produced by so-called "egg cracking" establishments, where typically the albumin or white of eggs and the yolks of the eggs are separated from the hard egg shells of the eggs for a variety of purposes. Such purposes may include the provision of liquid or frozen whole egg product which may be used by commercial food preparation establishments, commercial bakery establishments, and so on. In other cases, the albumin and the yolks of the eggs are separated one from the other for further processing, as is well known to those skilled in the art.

However, this results in the vast accumulation of broken egg shells, and problems of disposal of the same. One of those problems is the matter of the sheer volume of the recoverable broken egg shells. For example, studies have shown that in Canada over 60 tonnes of broken egg shells are discarded every day. Of course, in United States, such accumulation of broken egg shells per day is considerably greater. This results in severe issues surrounding the disposal of broken egg shells in landfill locations. Not only is there a significant accumulation of volume of the disposed egg shells, thus hastening the exhaustion of the capacity of landfill sites to accommodate waste from other sources, there is the problem surrounding the fact that disposed broken egg shells contain significant organic matter.

Of course, that organic matter is the organic membrane portion of the broken egg shells, which is adhered to the non-organic hard mineral portion of the broken egg shells. The presence of such organic material in landfill site may cause health hazards, may result in gas evolution in time, and may attract unwanted insects and animals to that landfill site.

This fact is further exacerbated because when a significant volume of broken egg shells is disposed of, there may be considerable void space within the disposed accumulation of broken egg shells simply because the irregular shapes of the curved pieces of broken egg shells will not easily nest one with the other thereby leaving void spaces disbursed throughout the discarded egg shells. This, of course, further exacerbates the problem of consumed volume of the landfill site, unless and until heavy rollers or earth moving equipment are driven over the disposed broken egg shells, so is to crush them.

There is, of course, the known fact that organic membrane portion of broken egg shells may be separated from the non-organic hard mineral portion of the broken egg shells, but to date no energy efficient apparatus or method has been developed to do so. Neither has there been an apparatus or method developed which results in substantially 100% yield of the organic membrane portion from the non-organic hard mineral portion of the broken egg shells.

The desirability for supply of separated organic membrane portion of broken egg shells to the food processing and pharmaceutical industries is because of the fact that a very high proportion of the organic membrane is protein matter, including collagens and many other types of protein matter.

Of course, it is also recognized that certain members of the food processing industry may find some use for the hard, non-organic, mineral portion of broken egg shells because of the significant calcium carbonate content thereof, as well as other mineral content such as phosphorus and other trace elements. but only if the hard mineral portion of the broken egg shells is substantially if not completely devoid of organic matter, and only if the hard mineral portion of broken egg shells is provided in finely ground or powder form.

Thus, markets exist in the food processing and pharmaceutical industries for the supply of highly refined, food grade or pharmaceutical grade organic membrane portions of broken eggs, and food grade or pharmaceutical grade ground or powdered non-organic hard mineral portions of broken eggs. It is to satisfy such requirements that the present invention is directed.

The inventors herein have unexpectedly discovered that they may take advantage of the distinct differences between the low specific gravity of the membrane portion of broken egg shells, typically below 1.0, and the relatively high specific gravity of the hard mineral portion of broken egg shells, which is typically in the range of 2.7 to 3.0. In doing so, the inventors can at least partially abrade finely divided particles of broken egg shells which have been ground, and then introduce the ground egg shell particles in the form of a slurry into one or more separating tanks within which a gentle upward serpentine flow of water will cause separation of the membrane portion from the hard mineral portion of the finely divided ground egg shells. The separated bits or pieces of the membrane portion will then become entrained and/or float in the water within the tank in the upper regions thereof. Moreover, the separated hard mineral portion of the finely divided ground egg shells will settle to the bottom of the separating tank, notwithstanding the upward flow of water from a dewatering device which is returned to the separating tank and flows past a plurality of overlapping vanes in an upward, serpentine flow pattern.

DESCRIPTION OF THE PRIOR ART

Issued U.S. Pat. No. 6,176,376, issued Jan. 23, 2001 in the name of MacNeil, teaches a method and apparatus for separating the membrane portion of waste egg shells from the hard mineral portion thereof. The waste egg shells are first processed so as to yield small egg shell particles. and during that process the egg shell particles are slightly abraded so as to disrupt the linking structure between the membrane and the shell. Thereafter, the egg shell particles are placed into a tank of water and are allowed to settle to the bottom of the tank. As they settle, the particles experience turbulent forces in the water or other liquid, which turbulent forces are such as to cause the membrane and shell portions to fully separate. The membrane particles tend to remain entrained in the water, for which they may be siphoned off and dewatered. The "clean"

egg shell particles which settle to the bottom of the tank may then be collected for drying or further processing. However, the description of the apparatus and method strongly suggest that the method is run in a batch manner, rather than continuously. It is also to be noted that the described apparatus and method are generally intended to be such that the materials of manufacture should be chosen in accordance with applicable regulatory standards, for example those of the United States Department of Agriculture.

A published United States Patent Publication, published Jul. 20, 2006 as US 2006/0159816, in the name of Vlad describes an egg shell membrane separation method which, however, is intended to be practiced at a location which is adjacent to or part of an egg hatchery. The continuous process which is described in the publication is said to reduce pathogens in the egg shell membranes, but since the hatchery waste is to be processed after the egg shells have been broken as a consequence of the hatching of chickens therefrom, there may be some doubt as to the value of any remaining egg shell membranes, the rest of which may well have been consumed during the development of the chicken within the egg. Moreover, undoubtedly the hatchery waste will contain feathers, feces and/or urine from the chick, and/or nesting material such as straw or the like.

In any event, the method described in the published application requires the placement of separated egg shells, the size of which is unknown, into a tank of fluid and applying cavitation to the fluid mixture so as to assist in separating the egg shell membranes from the egg shells. The described method suggests that a preferred range for the size of egg shell particles is preferably about 4 mm to 7 mm, which is far too large for use by the food processing industry without further cleaning and handling. In any event, there is no discussion as to the disposal of the separated egg shell particles, neither is there any discussion as to the efficiency of separation of the membrane from the egg shell particles.

SUMMARY OF THE INVENTION

In accordance with one aspect of the present invention, there is provided an apparatus for separating the organic membrane portion of broken egg shells from the non-organic hard mineral portion of the broken egg shells in a continuous process, wherein the membrane portion has a specific gravity of less than 1.0 and the hard mineral portion has a specific gravity in the range of 2.7 to 3.0.

Receiving bin means are provided for receiving and temporarily storing broken egg shells for separation of the membrane portions from the hard mineral portions thereof.

There is a mixing hopper into which water and broken egg shells are introduced, and from which the water and broken egg shells are introduced into a grinder, in which the broken egg shells are ground to a fine particle size so as to form an egg shell slurry. Also, at least partial abrasion and separation of the membrane portion and the hard mineral portion of the broken egg shells is initiated.

At least one vertically oriented separating tank is provided, into the top of which the egg shell slurry is introduced, and wherein separation of the membrane portion and the hard mineral portion of broken egg shells is effected.

There is at least one protein dewatering means to which the separated membrane portion of egg shells is delivered from the at least one separating tank.

Protein drying means are provided, to which dewatered protein is delivered from the at least one protein dewatering means.

There is also a mineral drying means to which the separated hard mineral portion of egg shells is delivered from the at least one separating tank.

Water feedback means are provided to return water from the at least one protein dewatering means to the at least one separating tank.

As to the at least one separating tank, it comprises an output port placed in the side wall thereof, through which water and separated membrane portion of broken egg shells are withdrawn therefrom for delivery to the protein dewatering and drying means.

A plurality of overlapping vanes are placed in the interior of the at least one separating tank in positions below the output port.

An input port is located near the bottom of the separating tank into which water from the water feedback means is reintroduced with sufficient force so as to cause an upwards, serpentine flow of the reintroduced water past the plurality of vanes.

The low specific gravity membrane portion will float or become entrained in the water in the separating tank, and the high specific gravity hard mineral portion will settle to the bottom of the separating tank.

It will be noted, however, that the force of the upward, serpentine flow of the reintroduced water past the vanes is not so great as to preclude the settling action of the high specific gravity hard mineral portion.

Thus, the membrane portion of broken egg shells and the hard mineral portion of broken egg shells are separated one from the other.

Typically, in the apparatus of the present invention, the bottom of the separating tank is sloped downwardly so as to form an apex.

Conveyor means are placed at the apex so as to convey the settled hard mineral portion of broken egg shells away therefrom.

Usually, in the apparatus of the present invention, there are first and second separating tanks, and the settled hard mineral portion which is conveyed away from the bottom of the first separating tank is introduced into the top of the second separating tank.

The second separating tank is similar to the first separating tank, and has an output port through which water and any remaining membrane portion of broken egg shells are withdrawn for delivery to a second protein dewatering means.

There is a second water feedback means to return water from the second protein dewatering means to the second separating tank.

Once again, a plurality of overlapping vanes is placed in the interior of the second separating tank in positions below the output port.

There is also an input port located near the bottom of the second separating tank, into which water from the second water feedback means is reintroduced with sufficient force so as to cause an upwards, serpentine flow of the reintroduced water past the plurality of vanes.

Accordingly, any remaining low specific gravity membrane portion will float or become entrained in the water in the second separating tank, and the high specific gravity hard mineral portion will settle to the bottom of the second separating tank.

Once again, the force of the upward, serpentine flow of the reintroduced water past the vanes in the second separating tank is not so great as to preclude the settling action of the high specific gravity hard mineral portion.

Therefore, any remaining low specific gravity membrane portion of broken egg shells in the second separating tank is separated from the hard mineral portion of broken egg shells.

In general, the overlapping vanes in the first and second separating tanks are downwardly directed.

Typically, there are respective conveyor means which are used to convey broken egg shells away from the receiving bin means to the mixing hopper; to convey the egg shell slurry away from the grinding means to the first separating tank; to convey the settled hard mineral portion of broken egg shells, and any membrane portion of broken egg shells adhered thereto, from the first separating tank to the second separating tank; to convey settled hard mineral portion of broken egg shells from the second separating tank to the mineral drying means; and to convey dried protein away from the protein drying means.

In the apparatus of the present invention, the area of each of the overlapping vanes is typically in the range of 55% to 65% of the cross-sectional area of each respective separating tank.

In general, the fine particle size of the ground egg shell exiting from the grinding means in the egg shell slurry is in the range of 0.5 mm up to 2.5 mm.

It will be understood that substantially 100% of the membrane portion of broken egg shells is recovered for further purposes; and substantially 100% of the ground hard mineral portion of broken egg shells is recovered for disposal and/or further purposes.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
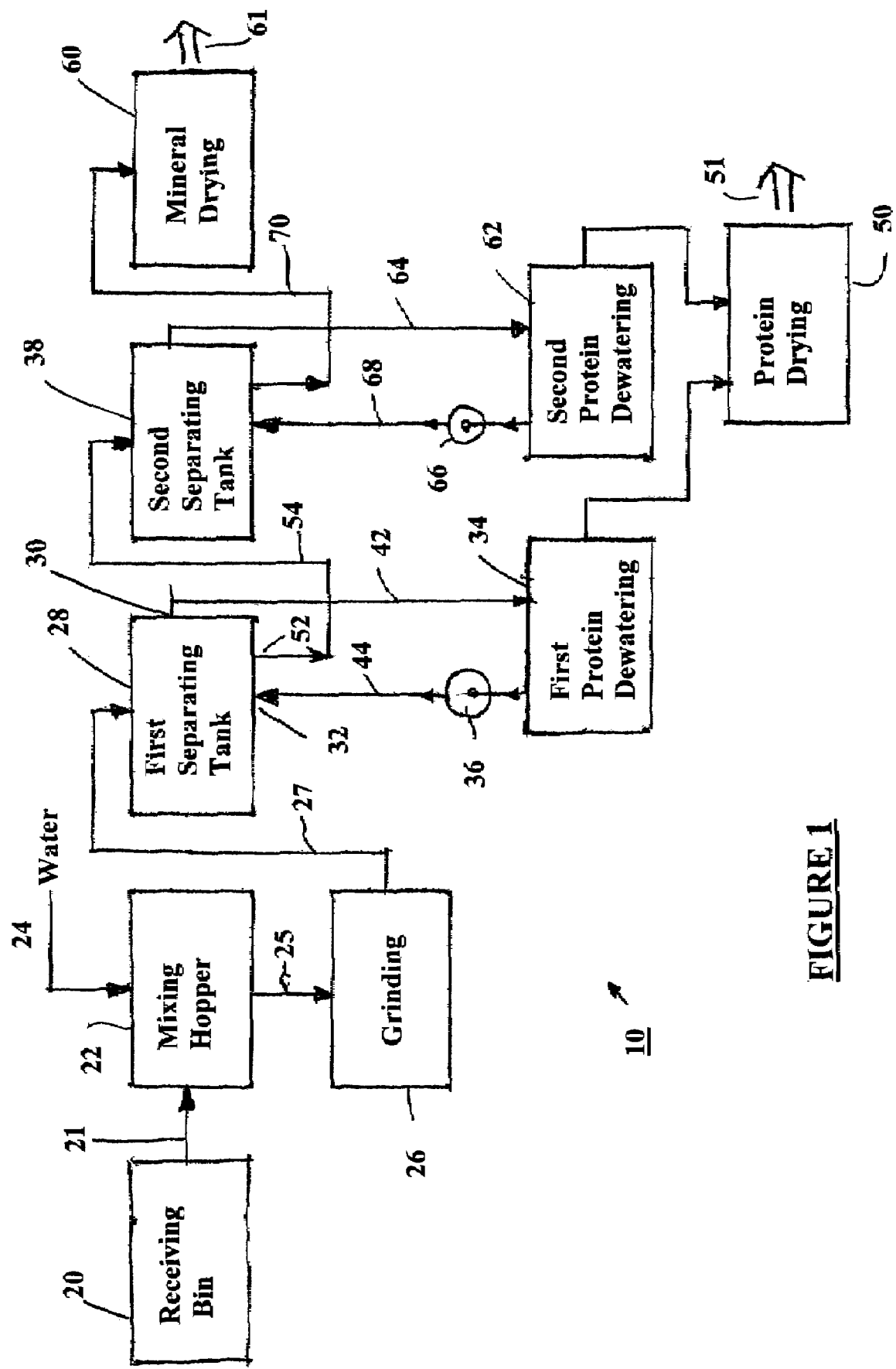
FIG. 1 is a schematic representation of the apparatus in keeping with the present invention.

Turning now to FIG. 1, a schematic representation of an apparatus for separating the organic membrane portion of broken egg shells from the hard mineral portion of broken egg shells is shown at 10. By following the schematic diagram from left to right as it is shown, the flow of broken egg shell material and water can be followed and easily understood.

In the first instance, broken egg shells are received into a receiving bin 20. Because the apparatus 10 is intended to run continuously, then continuous re-supply of broken egg shells to the receiving bin 20 is required for efficient operation of the apparatus 10. From the receiving bin 20, the broken egg shells are fed, usually by conveyor as is discussed hereafter, to a mixing hopper 22. (See arrow 21.)

Water is added to the broken egg shells which are in the mixing hopper 22, as shown at 24. Then, as indicated by arrow 25, the broken egg shells/water composition is fed to a grinding machine 26. Within the grinding machine 26, the broken egg shells/water composition is ground into fine particles—typically, the particle sizes will be in the range of from 0.5 mm up to 2.5 mm. Moreover, it should be noted that the material from the grinding machine 26 is, by now, in the form of an egg shell slurry.

Following the route of arrow 27, it will be seen that the egg shell slurry from the grinding machine 26 will then be fed or conveyed to the top of a first separating tank 28.

The nature of the first separating tank 28 is such that it has an output port 30 and an input port 32, the purposes of which will be described shortly. With brief reference to FIG. 2, it will be noted that within the interior of the first separating tank—and, indeed, of a second separating tank 38, which may or may not be present, as will be discussed hereafter—are a plurality of vanes 40. Those vanes are such that they are all of a sufficient size that the inner ends of the vanes, remote from where the vanes are secured to the wall of the separating bin, will overlap one another to some extent, but not significantly. The purpose for the overlapping vanes will be seen hereafter. However, it is also to be noted that although the vanes 40 are shown in a generally downwards orientation, they need not be downwardly directed, and may be horizontally disposed. Moreover, the nature of the vanes is such that they will have an area which is in the range of 55% to 65% of the cross-sectional area of the respective separating tank.

It will be seen that from the outlet port 30 of the separating tank 28, a suitable conduit 42 is directed to a protein dewatering apparatus 34. Moreover, a suitable conduit 44 leads away from the protein dewatering apparatus 34, so as to inject or reintroduce the water from the protein dewatering apparatus as the protein is being dewatered. However, in this case, the upward flow of the reintroduced water within conduit 44 is powered by a pump 36.

The nature of the liquid which is withdrawn from the separating tank 28 at the outlet port 30 is that it is water within which small particles of the membrane portion of broken eggs are either entrained and/or are floating in the water. Thus, the liquid withdrawn from the separating tank 28 at the outlet port 30 will contain protein matter which will be dewatered in the protein dewatering apparatus 34.

Water is withdrawn from the protein dewatering apparatus 34 and delivered back to the inlet port 32 of the separating tank 28 through pump 36 and along conduit 44.

Now, the separating operation in a separating tank can be described. As previously noted, the first separating tank has the egg shell slurry delivered thereto, through conduit 27. It will be recalled that the bits and pieces of the ground egg shell are quite small; and it will also be realized that during the grinding operation in the grinder 26 there may be significant or at least partial abrasion of the organic membrane portion relative to the hard mineral portion of the broken egg shells. Because of the significant differences in the specific gravity of the membrane portion of the broken egg shells and the hard mineral portion of the broken egg shells, particles of the organic membrane portion will tend to float or become entrained in the water. The specific gravity of the hard mineral portion of the broken eggs is significantly greater than that of water, and thus there will be a settling action of the bits and pieces of the hard mineral portion. Indeed, because of the significant differences in specific gravity of the organic membrane portion relative to the hard mineral portion, the very act of settling as a consequence of gravity, and of the consequent movement of the hard mineral particles, may be such as to loosen any organic membrane portion which may still be adhered to the particles of the hard mineral portion.

It has been noted that water from the first protein dewatering means is fed back into the inlet port of the separating tank, and that the inlet port 32 is located near the bottom of the separating tank. Thus, because the flow of reintroduced water is powered or impelled to some extent by the pump 36, the flow of reintroduced water is directed upwardly into the separating tank, past the vanes 40. However, because the vanes are such that the ends thereof overlap one other, the flow of water upwards past the vanes 40 will have a serpentine path. However, it should be noted that the force of the flow of the reintroduced water is not so great as to preclude a settling action of the high specific gravity hard mineral portion particles. On the other hand, because of the upward flow of reintroduced water conflicting with the force of gravity as it acts upon the particles of the high specific gravity hard mineral portion, the particles thereof will have a longer dwell time within the separating tank than would otherwise be the case. Moreover, it will be clearly understood that the flow of the reintroduced water is quite gentle, and may be enough to induce a swirling action of the water within the separating tank; but that flow does not create turbulence nor cavitation within the body of water.

It may be that substantially 100% of the organic membrane portion will have been recovered from the first separating tank 28. In that case, the dewatered protein from the dewatering apparatus 34 may be fed directly to protein drying apparatus 50, from which it will be withdrawn as shown by arrow 51 for packaging for delivery to a pharmaceutical or food processing establishment.

A conveyor 52 (see FIG. 2) is placed at the bottom of the separating tank so as to withdraw the settled particles of the hard mineral portion of the broken egg shells. That finally divided mineral matter will be conveyed away from the separating tank by a suitable conveying means which is shown generally at 54, and in general will be introduced into the top of the second separating tank 38, as discussed hereafter. In the event that only a single separating tank 28 is employed, then the separated finally divided mineral matter will be fed directly to a mineral drying means 60. Thereafter, the dry mineral powder which will be generally comprise elemental calcium and calcium salts such as calcium carbonate, will be removed for further packaging, handling, and delivery to a pharmaceutical or food preparation facility. In the event that the dry mineral powder is to be disposed of in such as a landfill site, it will be understood that the powder will pack very well with very little presence of void space.

In general, however, while a high percentage—in the range of at least 80% up to 95% or more—of the organic membrane portion of the broken egg shells is recovered from a first separating tank 28, it is usual for a second separating tank 38 also to be employed. The nature of the second separating tank 38 is exactly the same as the first separating tank 28, as described above, although its physical size may differ.

In such instances, the finally divided mineral matter which is withdrawn from the bottom of the first separating tank 28 will be conveyed for introduction at the top of the second separating tank 38. It will be understood, of course, that there may be a very small presence of organic membrane portion of broken egg shells in the principally mineral matter which is delivered to the second separating tank 38; but 100% of the hard mineral matter that was delivered to the first separating tank 28 will be delivered to the second separating tank 38. The liquid flow and water flow to and from the second separating tank 38 to a second protein dewatering means 62 is the same as that which is associated with the first separating tank 28, and comprises a suitable conduit 64, a second pump 66 and a suitable conduit 68 for return of the water from the second protein dewatering means 62 for reintroduction into the second separating tank 38. The separating action within the second separating tank 38 is the same as described above, except that recovery of organic membrane portion of the broken egg shells will be minimal with respect to that which has been recovered from the first separating tank 28. In any event, the withdrawn mineral matter from the second separating tank 38 is conveyed to the mineral drying apparatus 60 by suitable conveyor means 70.

It will be understood from the above discussion that operation of apparatus in keeping with the present is energy efficient in comparison to such apparatus as that described in the U.S. Pat. No. 6,176,376. The efficiencies come particularly from the fact that the present apparatus is to be operated in a continuous manner, thereby precluding wasted start-up energy for every batch. Also, there is no necessity for large motors to drive large and heavy devices required to create a significantly turbulent flow, or cavitation, in the separating tank.

The efficiency of organic membrane recovery in the present apparatus—especially when operated with two separating tanks—is higher than has heretofore been achieved, thus lessening the problem of unwanted organic matter being delivered to a mineral purchaser, or being placed in a landfill site.

Figure 2:
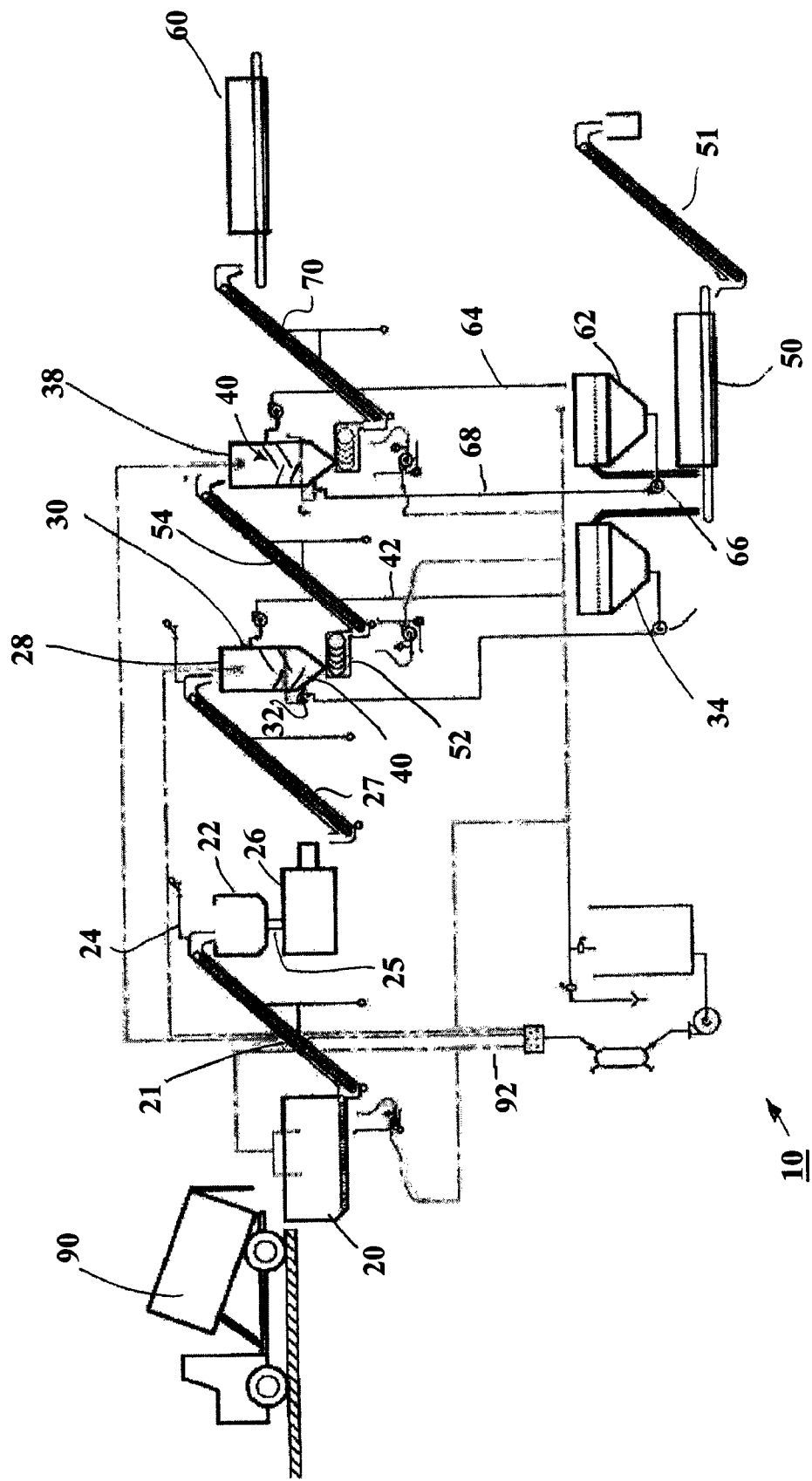
FIG. 2 is a more specific representation of the apparatus in keeping with present invention.

Turning now to FIG. 2, the same reference numerals are used to identify the same pieces of apparatus as is shown in FIG. 1, except that the shape and functionality the various items of apparatus may be more clearly understood from FIG. 2 than from FIG. 1. Thus, there is no necessity for any detailed discussion or description of FIG. 2, except as to note an additional feature or two which are shown therein. For example, it is clearly illustrated in FIG. 2 that the means of conveyance of the output from the receiving bin, the output of the grinding means, the mineral output of each of the separating tanks, and the output from the protein drying apparatus, are all comprised of suitable conveyor means, as are known to those skilled in the art.

Also, a truck 90 or other cargo conveying vehicle is shown delivering its load into the receiving bin 20. It will be understood that the illustration is strictly intended to show function, without any regard to the physical features of the truck 90. In fact, there are two ancillary features associated with the present invention which assure the maintenance of the quality of the broken egg shells, and the separated organic membrane portion and hard mineral portion thereof. Those matters become quite important when it is considered that, in general, the market for the separated organic membrane portion and the separated hard mineral portion of broken egg shells may be or will be various facilities and establishments throughout the pharmaceutical and food processing industries.

To that end, in general as the broken egg shells fall away from the egg cracking machines as detritus therefrom they are immediately removed to a storage facility which has a controlled atmosphere and temperature. Typically, the storage room is cool, in the range of about 5° to 7° C., and it may be flooded 92 with such gases as carbon dioxide, nitrogen, or other inert gases, or ozonated air. Such a storage operation and facility will act so as to substantially preclude spoilage of the organic membrane portion which is adhered to the pieces of broken egg shells. In particular, exposure to oxygen by the organic membrane portions adhered to the pieces of broken egg shells is substantially precluded. Thus, when the broken egg shells are delivered to the facility where there may be one or many apparatuses in keeping with present invention, their food and/or pharmaceutical quality is assured.

Moreover, so as to maintain a high food and/or pharmaceutical quality of the protein and mineral output from the apparatus keeping with the present invention, it is typical that all of the physical apparatus of any sort, such as the separating tanks, the protein dewatering apparatus, mixing hopper, the grinding machine, the protein drying machine, and the mineral drying machine, will all be made of such material as food or pharmaceutical grade stainless steel or other materials as may be approved by such as the FDA, the Federal or Provincial Ministries of Health, the State Health Authorities, and so on. Still further, ambient temperature and gas content in the location where the apparatus is installed may also be controlled so as to minimize exposure to oxygen.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic. e.g., substantially 100% is intended to mean 100%, just less than 100%, or about 100% as can be determined using ordinary measuring and determining apparatus.

We claim:

1. An apparatus for separating the organic membrane portion of broken egg shells from the non-organic hard mineral portion of the broken egg shells in a continuous process, wherein said membrane portion has a specific gravity of less than 1.0 and said hard mineral portion has a specific gravity in the range of 2.7 to 3.0, comprising:

receiving bin means for receiving and temporarily storing broken egg shells for separation of the membrane portions from the hard mineral portions thereof;

a mixing hopper into which water and broken egg shells are introduced;

grinding means into which water and broken egg shells from said mixing hopper are introduced, and in which the broken egg shells are ground to a fine particle size so as to form an egg shell slurry, and in which at least partial abrasion and separation of the membrane portion and the hard mineral portion of the broken egg shells is initiated;

at least one vertically oriented separating tank into the top of which said egg shell slurry is introduced, and wherein separation of the membrane portion and a hard mineral portion of broken egg shells is effected;

at least one protein dewatering means to which the separated membrane portion of egg shells is delivered from said at least one separating tank;

protein drying means to which dewatered protein is delivered from said at least one protein dewatering means;

mineral drying means to which the separated hard mineral portion of egg shells is delivered from said at least one separating tank; and water feedback means to return water from said at least one protein dewatering means to said at least one separating tank;

wherein said at least one separating tank comprises:

an output port placed in the side wall of said at least one separating tank, through which water and separated membrane portion of broken egg shells are withdrawn from the at least one separating tank for delivery to said protein dewatering and drying means;

a plurality of overlapping vanes placed in the interior of said at least one separating tank in positions below said output port; and an input port near the bottom of said at least one separating tank into which water from said water feedback means is reintroduced into said at least one separating tank with sufficient force so as to cause an upwards, serpentine flow of said reintroduced water past said plurality of vanes;

wherein said low specific gravity membrane portion will float or become entrained in the water in said at least one separating tank, and said high specific gravity hard mineral portion will settle to the bottom of said at least one separating tank; and wherein the force of said upward, serpentine flow of said reintroduced water past said vanes is not so great as to preclude the settling action of said high specific gravity hard mineral portion;

whereby said membrane portion of broken egg shells and said hard mineral portion of broken egg shells are separated one from the other.

2. The apparatus of claim 1, wherein the bottom said at least one separating tank is sloped downwardly so as to form an apex; and wherein conveyor means are placed at said apex so as to convey the settled hard mineral portion of broken egg shells away therefrom.

3. The apparatus of claim 2, wherein there are first and second separating tanks, and the settled hard mineral portion which is conveyed away from the bottom of said first separating tank is introduced into the top of said second separating tank;

said second separating tank having an output port through which water and any remaining membrane portion of broken egg shells are withdrawn for delivery to a second protein dewatering means;

second water feedback means to return water from said second protein dewatering means to said second separating tank;

a plurality of overlapping vanes placed in the interior of said second separating tank in positions below said output port; and an input port near the bottom of said second separating tank into which water from said second water feedback means is reintroduced into said second separating tank with sufficient force so as to cause an upwards, serpentine flow of said reintroduced water past said plurality of vanes;

wherein any remaining low specific gravity membrane portion will float or become entrained in the water in said second separating tank, and said high specific gravity hard mineral portion will settle to the bottom of said second separating tank; and wherein the force of said upward, serpentine flow of said reintroduced water past said vanes in said second separating tank is not so great as to preclude the settling action of said high specific gravity hard mineral portion;

whereby any remaining low specific gravity membrane portion of broken egg shells in said second separating tank is separated from said hard mineral portion of broken egg shells.

4. The apparatus of claim 3, wherein said overlapping vanes in said first and second separating tanks are downwardly directed.

5. The apparatus of claim 3, wherein respective conveyor means are used to convey broken egg shells away from said receiving bin means to said mixing hopper; to convey said egg shell slurry away from said grinding means to said first separating tank; to convey said settled hard mineral portion of broken egg shells, and any membrane portion of broken egg shells adhered thereto, from said first separating tank to said second separating tank; to convey settled hard mineral portion of broken egg shells from said second separating tank to said mineral drying means; and to convey dried protein away from said protein drying means.

6. The apparatus of claim 3, wherein the area of each of said vanes is in the range of 55% to 65% of the cross-sectional area of each respective separating tank.

7. The apparatus of claim 1, wherein the fine particle sizes of said ground egg shell exiting from said grinding means in said egg shell slurry are in the range of 0.5 mm up to 2.5 mm.

* * * * *